United States Patent [19]

Sudo

[11] Patent Number: 4,597,613
[45] Date of Patent: Jul. 1, 1986

[54] ELECTROMAGNETIC BEARING

[75] Inventor: Hajime Sudo, Yokohama, Japan

[73] Assignee: Kabushiki Kaisha Toshiba, Kawasaki, Japan

[21] Appl. No.: 650,497

[22] Filed: Sep. 14, 1984

[30] Foreign Application Priority Data

Sep. 30, 1983 [JP] Japan .................. 58-182729

[51] Int. Cl.$^4$ .................................. F16C 39/06
[52] U.S. Cl. ........................................ 308/10
[58] Field of Search ............... 308/10; 378/132, 131

[56] References Cited

U.S. PATENT DOCUMENTS

| 3,155,437 | 11/1964 | Kinsey et al. | |
| 3,888,553 | 6/1975 | Wehde | 308/10 |
| 3,955,858 | 5/1976 | Poubeau | 308/10 |
| 4,077,678 | 3/1978 | Studer | 308/10 |
| 4,081,707 | 3/1978 | Hartl et al. | |
| 4,167,671 | 9/1979 | Boden et al. | 308/10 |
| 4,340,261 | 7/1982 | Wehde | 308/10 |
| 4,468,801 | 8/1984 | Sudo et al. | 378/132 |

FOREIGN PATENT DOCUMENTS

| 2336603 | 7/1977 | France | 308/10 |
| 53-8858 | 4/1978 | Japan | |
| 0150618 | 11/1981 | Japan | 308/10 |
| 0019844 | 2/1983 | Japan | 308/10 |
| 2109596 | 6/1983 | United Kingdom | 308/10 |

Primary Examiner—R. Skudy

Attorney, Agent, or Firm—Oblon, Fisher, Spivak, McClelland & Maier

[57] ABSTRACT

An electromagnetic bearing wherein a group of magnetic poles is formed on each end of a columnar yoke. The magnetic pole groups each include four magnetic poles which protrude from the center of the yoke at right angles to one another and to the longitudinal direction of the yoke. A cylindrical supported body surrounds the yoke and the magnetic poles. A ring-shaped member formed of a ferromagnetic material is fixed to the inner peripheral surface of the supported body so that both end portions of the ring-shaped member are in alignment with the centers of their corresponding magnetic poles of the magnetic pole groups. Magnetic fluxes delivered from each aligned pair of magnetic poles enter the ring-shaped member substantially at right angles to the peripheral surface thereof, and return to those original magnetic poles via another pair of magnetic poles adjacent thereto. Thus, the supported body is supported in its radial direction. Magnetic fluxes pass through the yoke along its longitudinal direction, enter one end face of the ring-shaped member at right angles thereto via the magnetic poles of the first magnetic pole group, pass through the ring-shaped member along its longitudinal direction, and enter the magnetic poles of the second magnetic pole group via the other end face of the ring-shaped member. Thus, the supported body is supported in its longitudinal direction.

14 Claims, 9 Drawing Figures

ELECTROMAGNETIC BEARING

BACKGROUND OF THE INVENTION

The present invention relates to an electromagnetic bearing for magnetically supporting a supported body in suspension, and more specifically to an electromagnetic bearing having a simple, compact structure which more efficiently uses its magnetic flux.

Electromagnetic bearings are conventionally known as bearings for supporting a supported body such as a rotating body, in which the supported body is levitated by magnetic force so that it is not in contact with any stationary part. Thus free from contact, these magnetic bearings provide various advantages, such as no mechanical friction, no mechanical noise, high-speed rotation, etc.

Figure 1:
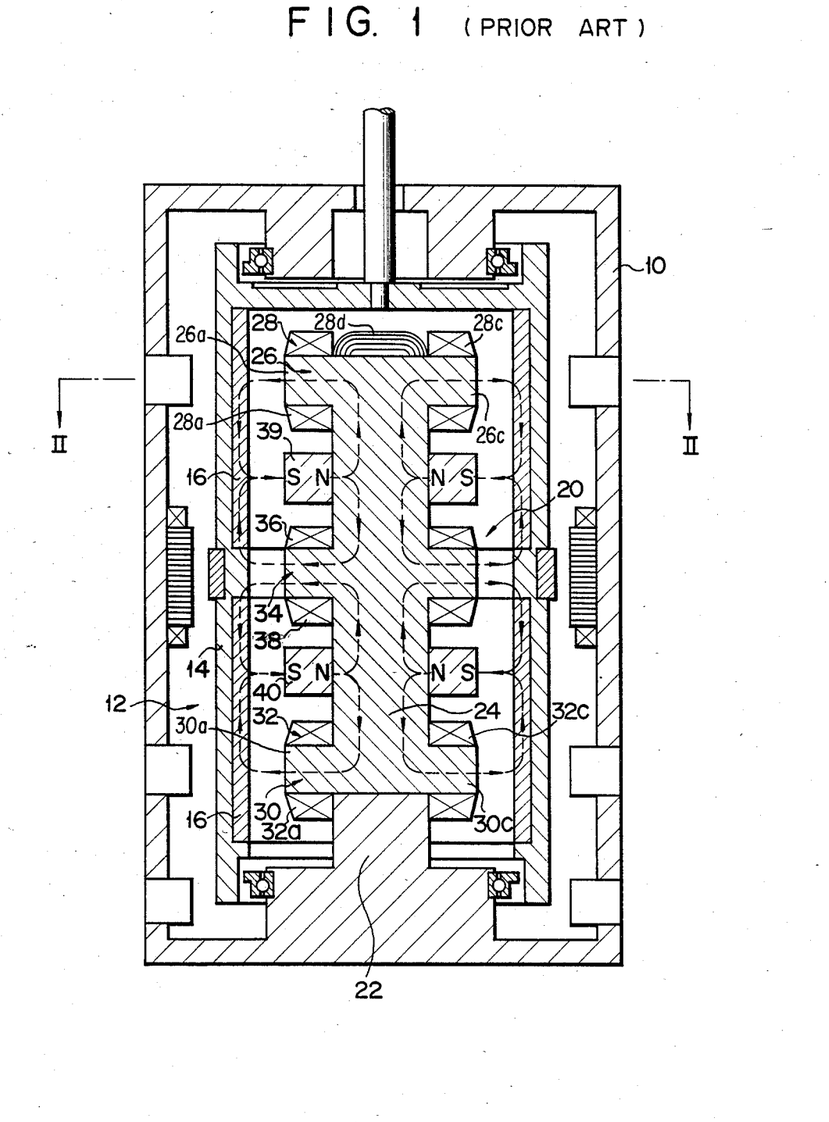
FIG. 1 is a longitudinal sectional view of a prior art electromagnetic bearing.
Figure 2:
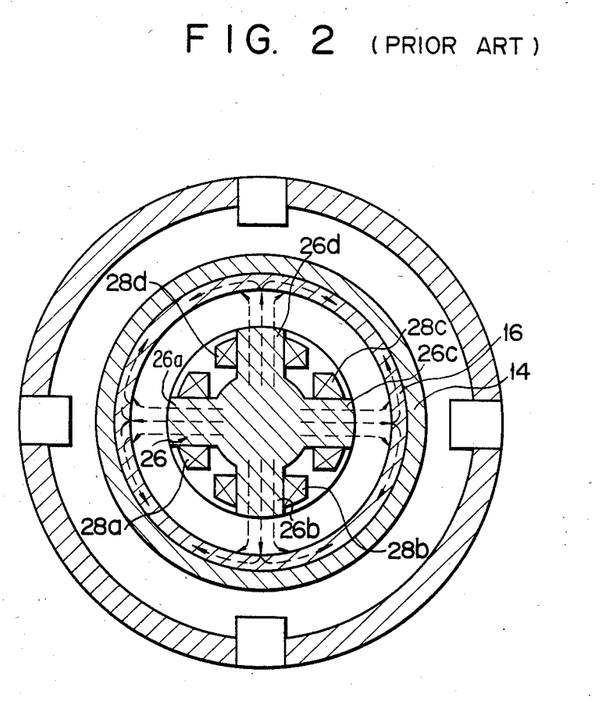
FIG. 2 is a cross-sectional view of the electromagnetic bearing of FIG. 1.

One such magnetic bearing is stated in, for example, Japanese Patent Disclosure No. 19844/83. In this magnetic bearing, as shown in FIG. 1, a cylindrical rotating body or supported body 12 is disposed in a case 10. A cylidrical member 14 of the supported body 12 is formed of a nonmagnetic material. A pair of ring-shaped members 16 is attached to the upper and lower portions of the inner peripheral surface of the cylndrical member 14. The ring-shaped members 16 are formed of a ferromagnetic material. Inside the supported body 12, a magnetic supporting means 20 is set on a base 22 at the bottom of the case 10. Two groups of magnetic poles 26 and 30 are formed on the upper and lower end portions, respectively, of a yoke 24 of the magnetic supporting means 20. Each group 26 or 30 includes four magnetic poles 26a, 26b, 26c and 26d (shown in FIG. 2) or 30a, 30b, 30c and 30d (only 30a and 30c are shown in FIG. 1) which protrude at a right angle to the longitudinal direction of the yoke 24 from the central portion thereof toward the ring-shaped members 16 and intersect it at right angles. The groups of magnetic poles 26 and 30 face the upper portion of the upper ring-shaped member 16 and the lower portion of the lower ring-shaped member 16, respectively. A ring-shaped magnetic pole 34 is formed on that portion of the yoke 24 which extends between the two groups of magnetic poles 26 and 30. The ring-shaped magnetic pole 34 faces that portion of the cylindrical member 14 which extends between the two ring-shaped members 16. Ring-shaped permanent magnets 39 and 40 are arranged on those portions of the yoke 24 between the one group of magnetic poles 26 and the magnetic pole 34 and between the other group of magnetic poles 30 and the magnetic pole 34. Coils 28a, 28b, 28c, 28d, 32a, 32b, 32c and 32d (32b and 32d are not shown in FIGS. 1 and 2) for adjusting the radial position of the supported body 12 are wound around the magnetic poles 26a, 26b, 26c, 26d, 30a, 30b, 30c and 30d, respectively. A pair of coils 36 and 38 wound around the yoke 24 is arranged individually on two flat surfaces of the ring-shaped magnetic pole 34. The coils 36 and 38 are used for adjusting the longitudinal position of the supported body 12. These coils are energized for controlling the following fluxes, and a magnetic flux delivered from the north pole of the permanent magnet 39 passes through the yoke 24 in loops indicated by the broken lines in FIG. 1, enters the ring-shaped members 16 via the groups of magnetic poles 26 and 34, and returns to the south pole of the permanent magnet 39. Likewise, magnetic flux delivered from the permanent magnet 40 which flux should be controlled by the energized coil returns thereto circulating in loops as indicated by the broken lines in FIG. 1. For example, magnetic flux from the magnetic pole 26a enters the upper ring-shaped member 16 substantially at right angles to the peripheral surface thereof. Therefore, if the energizing current of the coil 28a is increased to raise the magnetic flux density, the supported body 12 moves toward the magnetic pole 26a. Thus, the radial position of the supported body 12 can be adjusted by regulating the energizing currents of the groups of coils 28 and 32. Meanwhile, magnetic flux from the magnetic pole 34 enters the ring-shaped members 16 substantially at right angles to the lower and upper end faces of the upper and lower ring-shaped members 16. Accordingly, when the supported body 12 is located above a predetermined position, the energizing currents of the coils 36 and 38 are increased and decreased, respectively, so that the magnetic fluxes from the magnetic pole 34 which enter the upper and lower ring-shaped members 16 are intensified and weakened, respectively. Thus, the force of attraction between the upper ring-shaped member 16 and the magnetic pole 34 is increased to lower the supported body 12. The longitudinal and radial positions of the supported body 12 can individually be adjusted by regulating the coil energizing currents.

In the prior art electromagnetic bearing constructed in this manner, however, it is necessary that four magnetic poles be provided at each of the upper and lower portions of the yoke 24 to adjust and stabilize the supported body 12 in the radial direction, and that the magnetic pole 34 be provided for adjusting the longitudinal position of the supported body 12. Accordingly, this magnetic bearing requires a great number of magnetic poles and coils, and is complicated in construction and large-sized.

In another conventional electromagnetic bearing stated in U.S. Pat. No. 4,081,707, at least three electromagnets are arranged equidistantly on the circumference of a circle at each end of a rotating shaft. The electromagnets are positioned at an angle to the axis of the rotating shaft. In this case, a supported body is levitated by being subjected to a magnetic force in the axial and radial directions of the rotating shaft given by the slanted electromagnets. Thus, the required magnetic poles for the magnetic bearing may be reduced in number.

For fine positioning of the supported body in the axial or radial direction, however, it is necessary to adjust the coil energizing currents of a number of electromagnets. Accordingly, the supported body can be moved in one direction only after the energizing currents of a number of coils are calculated correlatively. This calculation is quite complicated; it is difficult to set the optimum current values and the control constant for position adjustment. In this magnetic bearing, the direction of the magnetic force acting on the supported body and the direction in which the supported body is to be moved are not coincident, intersecting each other at an angle of 90° or less. Hereupon, the components of the magnetic force at right angles to the direction of the movement of the supported body match with and cancel each other. The presence of the magnetic force in the aforesaid perpendicular direction, however, leads to a waste of current for driving the electromagnets. In other words, even though the energizing current is increased to move the supported body, the magnetic force component applied in the direction of the movement of the supported body is smaller than the increment of the magnetic force caused by the increase of the current, so that the current efficiency is low. Since the supported body and the electromagnets are inclined, it is hard to increase structural accuracy, and the setting accuracy is low.

SUMMARY OF THE INVENTION

The object of the present invention is to provide an electromagnetic bearing simple in construction, small in sized, which efficiently uses magnetic flux, and which is capable of stably supporting an object to be supported.

An electromagnetic bearing according to the present invention comprises magnetic supporting means and a supported body. The magnetic supporting means includes an elongated yoke; first and second groups of magnetic poles on the yoke spaced apart along the longitudinal direction of the yoke, each of the two groups including a plurality of magnetic poles protruding from the yoke and perpendicular to the longitudinal direction of the yoke; first and second groups of coils including a plurality of first and second coils wound around the first and second groups of magnetic poles, each of the first and second coils being adapted to produce magnetic flux along the protruding direction of each corresponding pole; and a third coil for producing magnetic flux along the longitudinal direction of the yoke. The supported body includes a magnetic coupling member formed of a highly permeable material, the magnetic coupling member extending along the longitudinal direction of the yoke and having end portions aligned individually with the first and second groups of magnetic poles, whereby magnetic fluxes, in order to enter and leave the magnetic coupling member in the direction substantially perpendicular to the longitudinal direction of the magnetic coupling member, are formed between the magnetic poles and the magnetic coupling member by the first and the second coils, and whereby magnetic fluxes, which enter and leave the magnetic coupling member substantially at right angles to their end faces, are formed between the magnetic poles and the magnetic coupling member by the third coil. In this way, the supported body is supported and suspended by the magnetic supporting means.

According to the present invention, a perpendicular magnetic force is applied to the end faces of the magnetic coupling member by the magnetic flux produced by the third coil. Also, perpendicular magnetic forces are applied to the peripheral surface of the magnetic coupling member by the magnetic fluxes produced by the first and second coils, if the magnetic coupling member is in the form of a hollow cylinder. Thus, subjected to the forces in the longitudinal direction of the magnetic coupling member and in the direction perpendicular thereto, the supported body is supported in suspension (no-contact state).

The individual magnetic poles of the first and second magnetic pole groups both apply magnetic forces to the magnetic coupling member in the longitudinal direction and in the direction perpendicular to the longitudinal direction. Accordingly, the magnetic poles of the magnetic supporting means are reduced in number, so that the electromagnetic bearing of the invention is simple in construction and small-sized.

The direction in which the magnetic fluxes from the magnetic supporting means enter and leave the magnetic coupling member of the supported body is substantially coincident with the moving direction (position control direction) of the supported body. In short, the direction of the magnetic forces is coincident with the moving direction of the supported body. Thus, the electromagnetic bearing according to the invention effectively uses magnetic flux, and efficiently uses a current. As it includes no inclined members, moreover, it is high in structural and setting accuracy.

DETAILED DESCRIPTION OF THE PREFERRED EMBODIMENTS

Figure 3:
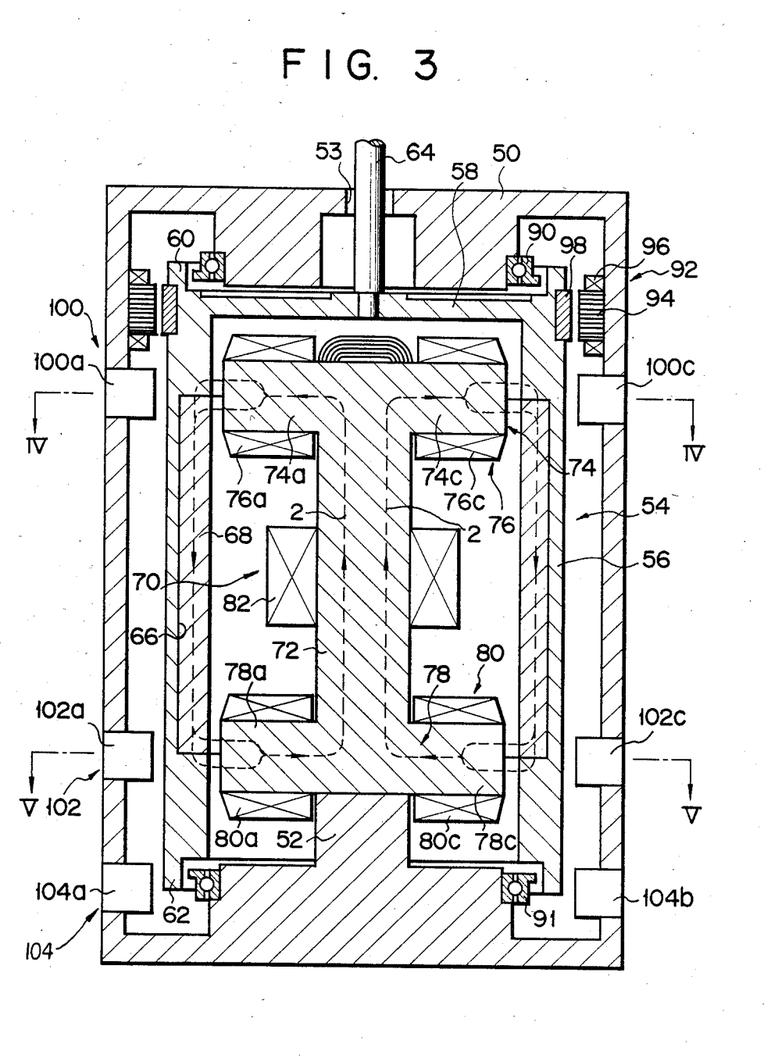
FIG. 3 is a longitudinal sectional view of an electromagnetic bearing according to one embodiment of the present invention.
Figure 4:
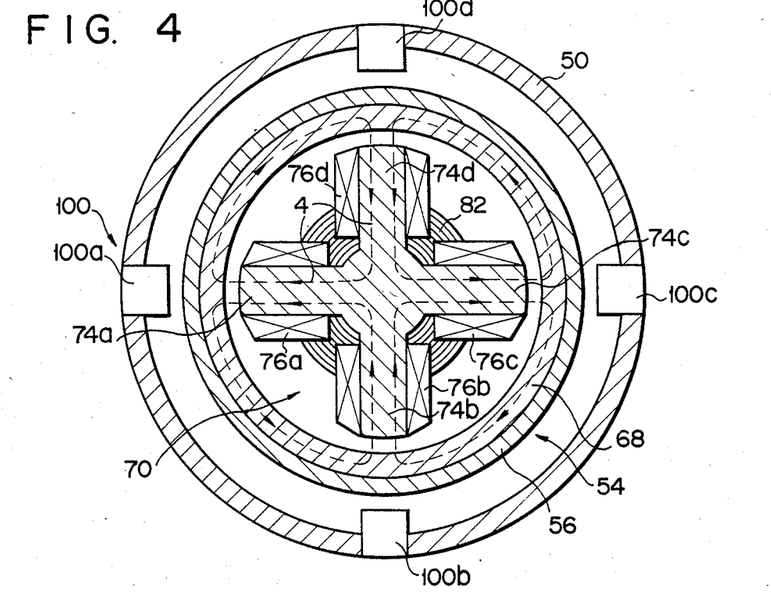
FIGS. 4 and 5 are sectional views taken along lines IV—IV and V—V of FIG. 3, respectively.
Figure 5:
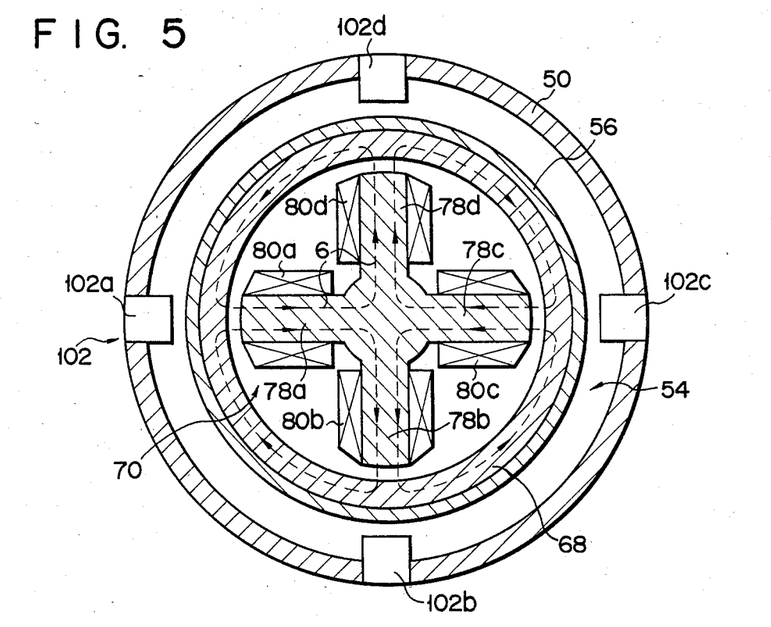

FIG. 3 is a longitudinal sectional view of an electromagnetic bearing according to one embodiment of the present invention, and FIGS. 4 and 5 are sectional views taken along lines IV—IV and V—V of FIG. 3, rspectively. In the case where the electromagnetic bearing is used in space equipment or in an X-ray tube, a cylindrical case 50 having both a top and a bottom is formed of a material which can intercept magnetism. Thus, the case 50 can prevent the penetration of external magnetism or the leakage of internal magnetism. A supported body (object to be supported) 54 formed of a nonmagnetic material is coaxially disposed in the case 50. The supported body 54 is composed of a cylindrical member 56 and a top wall 58 at the top of the cylndrical member 56. A rotating shaft 64 is fixed to the top wall 58 so as to be coaxial with the cylindrical member 56. The rotating shaft 64 passes through a hole 53 in the wall of the case 50 which faces the top wall 58, and is led out of the case 50. The rotating shaft 64 is coupled to a suitable object to rotate (not shown). A circumferentially extending endless recess 66 is formed in the inner peripheral surface of the cylindrical member 56. A magnetic coupling member or ring-shaped member 68 formed of a cylindrical ferromagnetic material is fitted in the recess 66. The cylindrical member 56 is formed at the upper and lower ends thereof, respectively, with projecting peripheral wall portions 60 and 62 which extend along the circumferential direction of the cylndrical member 56 and which slightly project along the longitudinal direction of the member 56. Bearing means 90 and 91 are fixed to the case 50 so as to face the projecting peripheral wall portions 60 and 62, respectively.

A magnetic supporting means 70 is disposed inside the supported body 54. A yoke 72 of the magnetic supporting means 70, which is formed of a highly permeable material, is fixed on a base 52 of the case 50. As shown in FIGS. 3, 4 and 5, a group 74 of magnetic poles 74a, 74b, 74c and 74d and another group 78 of magnetic poles 78a, 78b, 78c and 78d are formed on the upper and lower ends, respectively, of the yoke 72, protruding therefrom toward the inner peripheral surface of the supported body 54. The magnetic poles 74a, 74b, 74c and 74d are arranged so that a straight line connecting the centers of the magnetic poles 74a and 74c and a straight line connecting the centers of the magnetic poles 74b and 74d intersect at right angles on the center of the yoke 72. The magnetic poles of the magnetic pole group 78 are arranged in the same manner as those of the magnetic pole group 74. The centers of the magnetic poles of the two magnetic pole groups 74 and 78 are aligned with their corresponding ends of the ring-shaped member 68. The distance between each magnetic pole and the inner peripheral surface of the supported body 54 is suitably set. Coils 76a, 76b, 76c, and 76d, of coil group 76 and coils 80a, 80b, 80c and 80d of coil group 80 for adjusting the radial position of the supported body 54 are wound around the magnetic poles 74a, 74b, 74c, 74d, 78a, 78b, 78c and 78d, respectively. Meanwhile, a coil 82 for adjusting the longitudinal position of the supported body 54 is wound around that portion of the yoke 72 which extends between the two magnetic pole groups 74 and 78.

Two groups of sensors 100 and 102 for detecting the radial position of the supported body 54 are attached to the case 50, facing their corresponding magnetic pole groups 74 and 78 with the supported body 54 between them. Sensors 100a, 100b, 100c and 100d of the sensor group 100 and sensors 102a, 102b, 102c and 102d of the sensor group 102 face the magnetic poles 74a, 74b, 74c, 74d, 78a, 78b, 78c and 78d, respectively, with the supported body 54 between them. Further, sensors 104a and 104b of a sensor group 104 for detecting the longitudinal position of the supported body 54 are disposed in positions facing the lower projecting peripheral wall portion 62 of the cylndrical member 56. These sensors may be formed of eddy-current displacement gauges or the like. The position of the supported body 54 is detected by using the two sensors 104a and 104b in a differential manner.

A motor 92 for rotating the supported body 54 is disposed in the vicinity of the upper projecting peripheral wall portion 60 of the cylindrical member 56. The motor 92 includes a stator 94 fixed to the inner peripheral surface of the case 50 and a rotor 98 fixed to the outer peripheral surface of the cylindrical member 56. A coil 96 is wound around the stator 94. The supported body 54 supported in suspension by the magnetic supporting means 70 is rotated by the motor 92.

The output of the sensors 100, 102 and 104 is applied to the input of the control devices (not shown) to adjust the radial and longitudinal directions of the supported body 54. These control devices adjust the position of the supported body 54 by changing the currents flowing through the coils if the position of the supported body 54 detected by the sensors is deviated from a predetermined position.

The operation of the electromagnetic bearing constructed in this manner will now be described. As indicated by broken lines 2 in FIG. 3, magnetic fluxes produced by the coil 82 pass through the yoke 72, and enter the upper end of the ring-shaped member 68 of the supported body 54 substantially at right angles to the upper end face thereof via the magnetic poles 74a, 74b, 74c and 74d. Then, the magnetic fluxes pass through the ring-shaped member 68, escape from the lower end of the ring-shaped member 68 substantially at right angles to the lower end face thereof, and enter the magnetic poles 78a, 78b, 78c and 78d. Thus, the magnetic fluxes from the coil 82 produce a magnetic force which acts on the ring-shaped member 68 at right angles to the end faces thereof (in the longitudinal direction), so that the supported body 54 is supported and suspended. In this case, part of the magnetic flux directed from the magnetic pole 74a toward the ring-shaped member 68 enters the ring-shaped member 68 at right angles to the inner peripheral surface thereof. This magnetic flux produces a magnetic force to act radially on the supported body 54. This magnetic force and the magnetic force acting between the opposite magnetic pole 74c and the ring-shaped member 68 cancel each other. Thus, the supported body 54 will never be subjected to the radial force attributed to the magnetic fluxes produced by the coil 82.

As indicated by broken lines 4 in FIG. 4, on the other hand, magnetic fluxes produced by the coil 76a enter the ring-shaped member 68 via the magnetic pole 74a substantially at right angles to the inner peripheral surface of the ring-shaped member 68, pass through the ring-shaped member 68 along its circumferential direction, and return to the magnetic pole 74a via the magnetic poles 74b and 74d. Likewise, magnetic fluxes produced by the coil 76c enter the ring-shaped member 68 via the magnetic pole 74c substantially at right angles to the inner peripheral surface of the ring-shaped member 68, pass through the ring-shaped member 68 along its circumferential direction, and return to the magnetic pole 74c via the magnetic poles 74b and 74d. Thus, magnetic forces act in the direction substantially perpendicular to the inner peripheral surface of the ring-shaped member 68 between the ring-shaped member 68 and the magnetic poles 74a, 74b, 74c and 74d, and the supported body 54 is supported in its radial direction. Likewise, magnetic fluxes produced by the coil group 80 flow in loops as indicated by the broken lines 6 in FIG. 5. For example, the magnetic fluxes caused by the coil 80a enter the ring-shaped member 68 via the magnetic pole 78a substantially at right angles to the inner peripheral surface of the ring-shaped member 68, pass through the ring-shaped member 68 along the circumferential direction thereof, and return to the magnetic pole 78a. Likewise, the magnetic fluxes caused by the coil 80c enter the ring-shaped member 68 via the magnetic pole 78c substantially at right angles to the inner peripheral surface of the ring-shaped member 68, pass through the ring-shaped member 68 along the circumferential direction thereof, and return to the magnetic pole 78c. Thus, magnetic forces act in the radial direction of the ring-shaped member 68 between the ring-shaped member 68 and the magnetic pole group 78, and the supported body 54 is supported in its radial direction. Consequently, the supported body 54 is supported at its upper and lower end portions by radial magnetic forces from the magnetic pole groups 74 and 78, respectively.

If the coil 96 of the motor 92 is energized while the supported body 54 is supported and suspended (no-contact state) by the magnetic supporting means, the supported body 54 rotates, so that the object of rotation is rotated through the medium of the rotating shaft 64.

Meanwhile, if a radial external force is applied to the supported body 54 through the rotating shaft 64, the supported body 54 radially shifts its position. For example, if the supported body 54 moves toward the magnetic pole 74a, the distance between the sensor 100a and the supported body 54 is widened, while that between the sensor 100c and the supported body 54 is narrowed. The outputs of the sensors 100a and 100c are applied to the input of the control device for radial position adjustment, whereby the coil energizing currents are corrected in accordance with the displacement of the supported body 54. Namely, the currents flowing through the coils 76a and 76c are decreased and increased, respectively. Thereupon, the magnetic flux density between the magnetic pole 74a and the ring-shaped member 68 is lowered, while that between the magnetic pole 74c and the ring-shaped member 68 is raised. As a result, the force of the magnetic pole 74c to attract the ring-shaped member 68 is intensified, so that the supported body 54 moves toward the magnetic pole 74c. As the supported body 54 moves in this manner, the displacement caused by external force is corrected, and the supported body 54 returns to its original position. Between the ring-shaped member 68 and the magnetic poles 74b and 74d, the magnetic fluxes from the magnetic poles 74c and 74a increase and decrease, respectively. Therefore, these magnetic fluxes may be kept constant by adjusting the coil energizing currents so that the increment and decrement of the magnetic fluxes are equal. Thus, there is no variation of the magnetic force in the direction connecting the magnetic poles 74b and 74d, so that the supported body 54 is not moved in this direction. If the increase of the magnetic flux density of the magnetic pole 74c is not equal to the decrease of the magnetic flux density of the magnetic pole 74a, the magnetic flux densities of the magnetic poles 74b and 74d will be changed. However, since the changes in the magnetic flux density the magnetic poles 74b and 74d are equivalent, the variations of the magnetic forces acting between the ring-shaped member 68 and the magnetic poles 74b and 74d are equal. Accordingly, the Supported body 54 will never be moved in the direction connecting the magnetic poles 74b and 74d.

If any external force acts on the rotating shaft 64 along its axial direction, the supported body 54 longitudinally shifts its position. This displacement is detected by the sensors 104a and 104b, and applied to the input of the control device for longitudinal position adjustment. The control device modifies the current to flow through the coil 82 in accordance with the displacement. If the supported body 54 is shifted downward, the current flowing through the coil 82 is increased, so that the density of the magnetic fluxes between the ring-shaped member 68 and the magnetic pole groups 74 and 78, as indicated by the broken lines 2 in FIG. 3, is increased. As a result, the magnetic coupling strength between the yoke 72 and the ring-shaped member 68 is increased, and the top end face of the ring-shaped member 68 is attracted to the magnetic pole group 74, so that the supported body 54 is raised. In this manner, the longitudinal displacement of the supported body 54 caused by the external force is corrected, and the supported body 54 returns to its original position. Thus, the magnetic forces act to remove the radial and longitudinal displacements of the supported body 54 to restore it to the original position, so that the supported body 54 is supported stably. In case of service interruption, the projecting peripheral wall portions 60 and 62 of the cylindrical member 56 engage the bearing means 90 and 91 so that the supported body 54 is supported mechanically.

In the electromagnetic bearing of this embodiment, the two groups of magnetic poles 74 and 78 serve also as magnetic poles for supporting the supported body in the radial and longitudinal directions. Therefore, the electromagnetic bearing is simple in construction and small-sized, requiring a reduced number of magnetic poles. Moreover, since the direction in which the supported body is to be moved is coincident with the direction of the magnetic force, the efficiency of the magnetic force is high, ensuring low power consumption.

Figure 6:
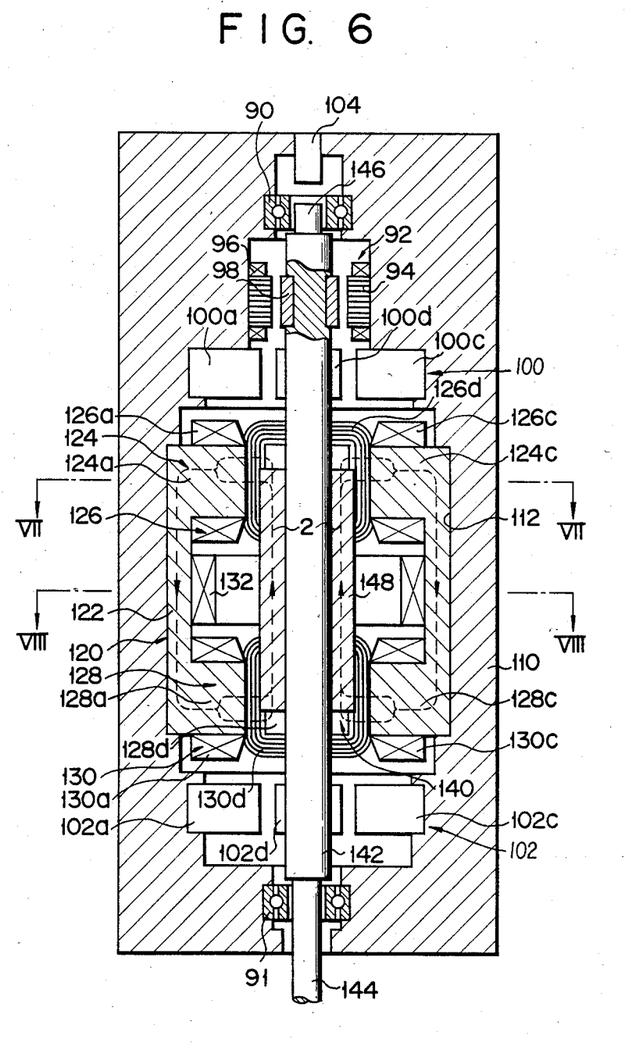
FIG. 6 is a longitudinal sectional view of an electromagnetic bearing according to another embodiment of the invention.
Figure 7:
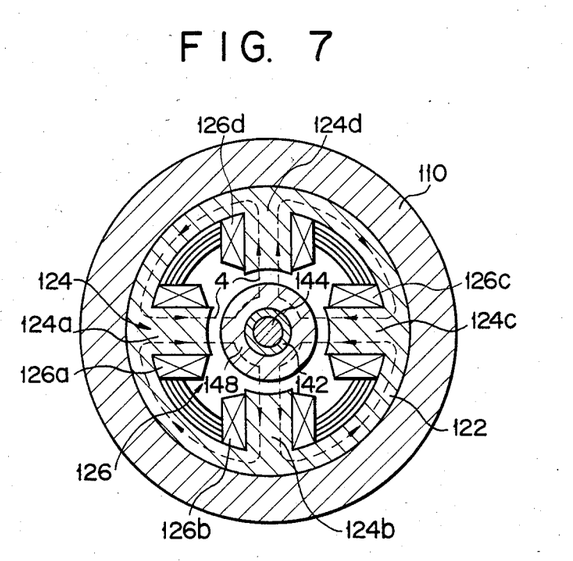
FIGS. 7 and 8 are sectional views taken along lines VII—VII and VIII—VIII of FIG. 6, respectively.
Figure 8:
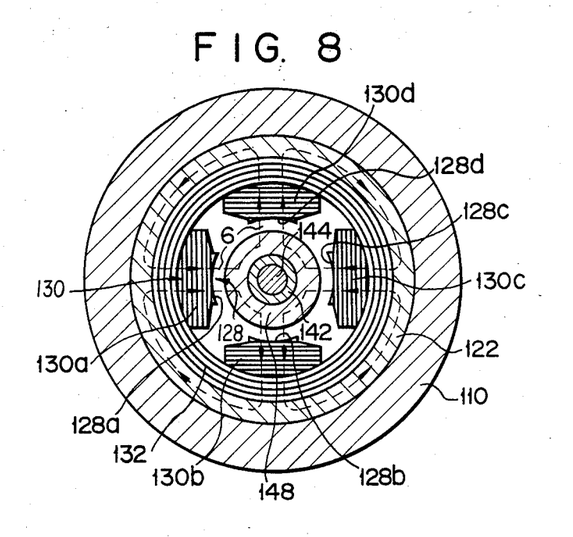

Referring now to FIGS. 6 to 8, another embodiment of the present invention will be described. In this second embodiment, the supported body is supported in a manner such that it is passed through the yoke. Magnetic supporting means 120 is disposed in a case 110. A yoke 122 of the magnetic supporting means 120, which is a cylindrical structure formed of a ferromagnetic material, is fitted in a recess 112 cut in the inner wall surface of the case 110. The magnetic supporting means 120 is provided with two groups of magnetic poles 124 and 128 formed on the upper and lower ends, respectively, of the yoke 122. As shown in FIG. 7, the magnetic pole group 124 includes four magnetic poles 124a, 124b, 124c and 124d which are arranged at regular intervals on the inner peripheral surface of the yoke 122 along the circumferential direction thereof and protrude toward the axis of the yoke 122. Coils 126a, 126b, 126c and 126d of a coil group 126 are wound around the individual magnetic poles 124a, 124b, 124c and 124d, respectively, of the magnetic pole group 124. As shown in FIG. 8, the magnetic pole group 128 includes magnetic poles 128a, 128b, 128c and 128d which are arranged on the inner peripheral surface of the yoke 122 along the circumferential direction thereof so as to be in alignment with the magnetic poles 124a, 124b, 124c and 124d, respectively, and protrude toward the axis of the yoke 122. Coils 130a, 130b, 130c and 130d of a coil group 130 are wound around the magnetic poles 128a, 128b, 128c and 128d, respectively. A coil 132 is fitted in the inside space of the yoke 122 between the two magnetic pole groups 124 and 128, extending along the inner peripheral surface of the yoke 122.

A supported body 140 is passed through the yoke 122. A hollow cylindrical member 142 formed of a nonmagnetic material is disposed coaxially with the yoke 122. A rotating shaft 144 is coaxially fixed to the lower end of the cylindrical member 142, while a columnar projection 146 is fixed to the upper end of the cylindrical member 142. A ring-shaped member 148 formed of a ferromagnetic material is fitted on that portion of the cylindrical member 142 which is surrounded by the yoke 122. The ring-shaped member 148 has a length such that its upper end is aligned with the centers of the magnetic poles 124a to 124d of the upper magnetic pole group 124 and its lower end is aligned with those of the magnetic poles 128a to 128d of the lower magnetic pole group 128. A motor 92 for rotating the supported body 14 is disposed in the vicinity of the upper end of the cylindrical member 142. The motor 92 includes a stator 94 fixed to the case 110, a coil 96 wound around the stator 94, and a rotor 98 fixed to the cylindrical member 142. Bearing means 90 and 91 are arranged beside the projection 146 and the rotating shaft 144, respectively. Two groups of sensors 100 and 102 for detecting the radial displacement of the supported body 140 are arranged near the upper and lower end portions, respectively, of the cylindrical member 142 of the supported body 140. Each of the sensor groups 100 and 102 includes four sensors 100a, 100b, 100c and 100d or 102a, 102b, 102c and 102d (only 100a, 100c, 100d, 102a, 102c and 102d are shown in FIG. 6) which are arranged at intervals along the circumferential direction of the yoke 122 in alignment with their corresponding magnetic poles of the magnetic pole group 124 or 128. A sensor 104 for detecting the longitudinal position of the supported body 140 is fixed to the case 110 in the vicinity of the projection 146 on the top end of the cylindrical member 142.

Also in the electromagnetic bearing constructed in this manner, magnetic fluxes produced by the coil 132 pass through the yoke 122 along its longitudinal direction, and enter the ring-shaped member 148 substantially at right angles to the lower end face thereof, as indicated by broken lines 2 in FIG. 6. Then, the magnetic fluxes pass through the ring-shaped member 148 along its longitudinal direction, and escape from the upper end of the ring-shaped member 148 substantially at right angles to the upper end face thereof. The supported body 140 is longitudinally supported by the magnetic fluxes which flow in the loops shown in FIG. 6. Meanwhile, magnetic fluxes delivered from the magnetic pole groups 124 and 128 flow in loops between the individual magnetic poles and the ring-shaped member 148, as indicated by broken lines 4 and 6 in FIGS. 7 and 8. As a result, the supported body 140 is supported radially. Thus, the supported body 140 is supported and suspended by the magnetic supporting means 120. If the supported body 140 is shifted in the longitudinal or radial direction, it is urged to return to its original position by adjusting the currents to flow through the coils. Thus, the supported body 140 is supported stably. As seen from the above description, this embodiment produces the same effect as the first embodiment shown in FIGS. 3 to 5.

Figure 9:
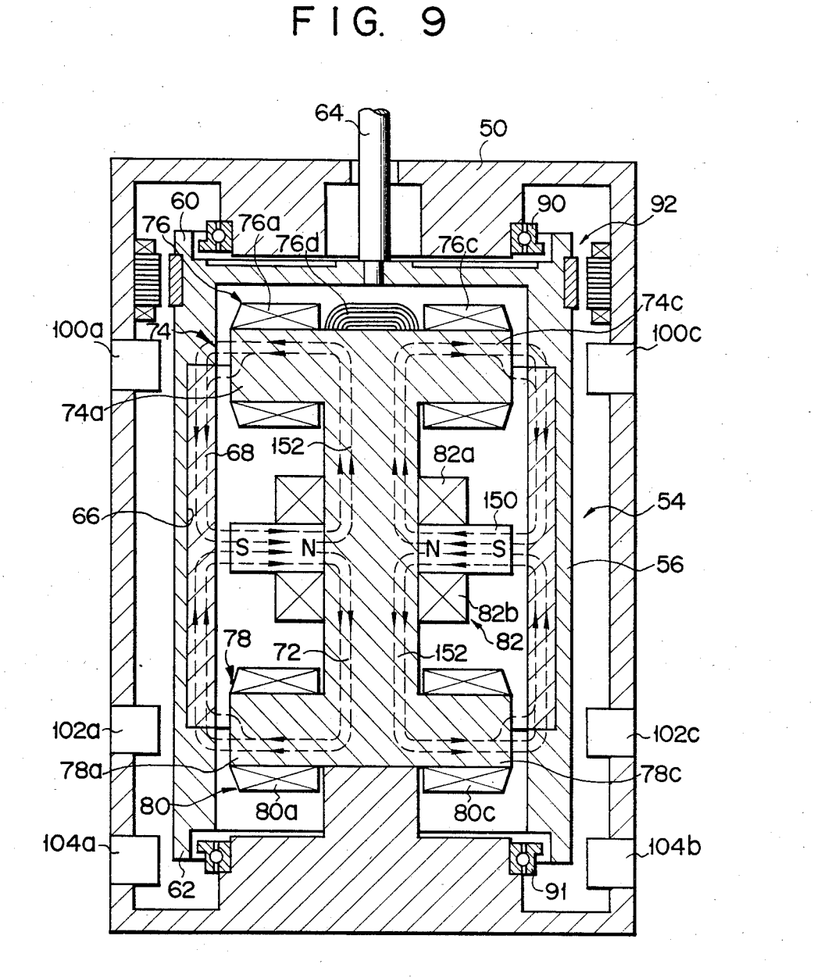
FIG. 9 is a longitudinal sectional view showing still another embodiment of the invention.

Referring now to FIG. 9, still another embodiment of the present invention will be described. This third embodiment differs from the first embodiment of FIGS. 3 to 5 in that the coil 82 for adjusting the longitudinal position of the supported body 52 is divided into two coil portions 82a and 82b arranged along the longitudinal direction of the yoke 72, and that a ring-shaped permanent magnet 150 is interposed between the coil portions 82a and 82b. In the description to follow, like reference numerals are used to designate like portions included in the first embodiment of FIGS. 3 to 5. The permanent magnet 150 is fitted in the yoke 72, and is magnetized from the outer peripheral surface side to the inner peripheral surface side thereof. By the use of the permanent magnet 150, magnetic fluxes describing loops as indicated by broken lines 152 in FIG. 8 are formed between the permanent magnet 150, yoke 72, magnetic pole group 74 (78), and ring-shaped member 68. These magnetic fluxes, which serve as a DC bias magnetic force, can reduce the current flowing through the coil 82 for longitudinally supporting the supported body 54. According to this embodiment, therefore, the supported body can be magnetically supported with lower current consumption and with higher efficiency.

In any of the embodiments described above, the supported body floated by magnetic force is in the form of a cylindrical rotating body. However, the present invention may also be applied to a bearing for supporting an object which moves in a straight line.

What is claimed is:

1. An electromagnetic bearing comprising:
magnetic supporting means including an elongated yoke, first and second groups of magnetic poles on the yoke defining an axis spaced along the longitudinal direction of the yoke, each member of said group including a plurality of magnetic poles protruding from the yoke perpendicular to the longitudinal direction of the yoke, first and second groups of coils including a plurality of first and second coils wound around the first and second groups of magnetic poles, each of said coils being adapted to produce magnetic flux along the protruding direction of each corresponding pole, and a third coil for producing magnetic flux along the longitudinal direction of the yoke; and a supported body including a magnetic coupling member formed of a ferromagnetic material, said magnetic coupling member extending along the longitudinal direction of the yoke and having end portions aligned individually with the first and second groups of magnetic poles, whereby magnetic fluxes are formed between the magnetic poles and the magnetic coupling member by the first and second coils and enter and leave the magnetic coupling member in the direction substantially perpendicular to the longitudinal direction of the magnetic coupling member, and magnetic fluxes are formed between the magnetic poles and the magnetic coupling member by the third coil and enter and leave the magnetic coupling member substantially at right angles to the end faces of the magnetic coupling member.

2. The electromagnetic bearing according to claim 1, wherein each of said first and second groups of poles includes first, second, third and fourth magnetic poles formed on the yoke protruding from the yoke toward an inner peripheral surface of the supported body, wherein the first, second, third and fourth magnetic poles are arranged so that a straight line connecting the centers of the first and third magnetic poles and a straight line connecting the centers of the second and fourth magnetic poles intersect at right angles on the center of the yoke.

3. The electromagnetic bearing according to claim 2, wherein said supported body includes a cylindrical member formed of a nonmagnetic material, and said magnetic coupling member is in the form of a hollow cylinder fixed inside the cylindrical member, and said magnetic supporting means is disposed inside the magnetic coupling member so that the centers of arrangement of the magnetic poles are in alignment with the center of the magnetic coupling member.

4. The electromagnetic bearing according to claim 3, wherein said yoke is columnar, and said third coil is wound around that portion of the yoke between the first and second magnetic pole groups.

5. The electromagnetic bearing according to claim 2, wherein said supported body includes a cylindrical member formed of a nonmagnetic material, and said magnetic coupling member is in the form of a hollow cylinder fitted on the cylindrical member, and said magnetic supporting member is disposed outside the magnetic coupling member so that the centers of arrangement of the magnetic poles are in alignment with the center of the magnetic coupling member.

6. The electromagnetic bearing according to claim 5, wherein said yoke is in the form of a hollow cylinder, and each of said magnetic poles protrudes from the yoke toward the axis of the yoke.

7. The electromagnetic bearing according to claim 6, wherein said third coil is disposed in contact with the inner peripheral surface of the yoke so that the axis of the third coil is in alignment with that of the yoke.

8. The electromagnetic bearing according to claim 1, further comprising a permanent magnet for producing a DC bias magnetic flux extending along the longitudinal direction of the yoke.

9. The electromagnetic bearing according to claim 8, wherein said yoke is columnar, and said permanent magnetic is in the form of a ring fitted on the yoke.

10. The electromagnetic bearing according to claim 1, further comprising a case, formed of a material capable of intercepting magnetism, for containing the magnetic supporting means and the supported body.

11. The electromagnetic bearing according to claim 1, further comprising a plurality of sensors for detecting the position of the supported body in the direction perpendicular to the longitudinal direction of the yoke.

12. The electromagnetic bearing according to claim 11, further comprising a sensor for detecting the position of the supported body in the longitudinal direction of the yoke.

13. The electromagnetic bearing according to claim 1, wherein said supported body includes a cylindrical member formed of a nonmagnetic material, said electromagnetic bearing further comprising a motor including a rotor disposed on the outer peripheral surface of the cylindrical member and a stator provided on the case, whereby the supported member is rotated.

14. The electromagnetic bearing according to claim 10, wherein said supported body includes a cylindrical member having projecting peripheral wall portions formed at the upper and lower ends thereof, said electromagnetic bearing further comprising bearing means, provided on the case, for engaging the projecting peripheral wall portions when the supported body is not supported by the magnetic supporting means.

* * * * *